United States Patent [19]

Cheng et al.

[11] 4,079,596
[45] Mar. 21, 1978

[54] HEAT ENGINES AND HEAT PUMPS

[76] Inventors: Chen-yen Cheng, 9605 La Playa St., NE., Albuquerque, N. Mex. 87111; Sing-Wang Cheng, Fourth Floor, No. 1, Lane 479, Fu-Hsing North Rd., Taipei, Taiwan

[21] Appl. No.: 669,719

[22] Filed: Mar. 24, 1976

Related U.S. Application Data

[63] Continuation-in-part of Ser. No. 474,317, May 29, 1974, Pat. No. 3,953,973.

[51] Int. Cl.² ........................................... F25B 23/00
[52] U.S. Cl. .................................. 62/467 R; 62/114
[58] Field of Search ............... 62/467, 324, 114, 437; 60/527; 165/104 R, 104 M, 2; 252/67

[56] References Cited

PUBLICATIONS

Engineering Thermodynamics, Stoever, p. 177, 1951, John Wiley & Sons, Inc.

*Primary Examiner*—William E. Wayner

[57] ABSTRACT

The present invention introduces a heat engine, or a heat pump, in which the working medium used is subjected alternatively to solidification and melting operations. A working medium so used is referred to as an S/L type working medium. In a new heat engine, an S/L type working medium is subjected to cyclic operations, each cycle comprises of a high temperature melting step conducted under a first pressure, and a low temperature solidification step conducted under a second pressure. In a new heat pump, each cycle comprises of a high temperature solidification step conducted under a first pressure and a low temperature melting step conducted under a second pressure. When a non-aqueous medium is used, the first pressure and the second pressure are a relatively high pressure and a relatively low pressure, respectively. When an aqueous medium is used the two pressures are a relatively low pressure and a relatively high pressure, respectively. It is noted that the operation of a heat pump is the reverse operation of a heat engine.

4 Claims, 29 Drawing Figures

An Engine Utilizing an S/L Type Working Medium

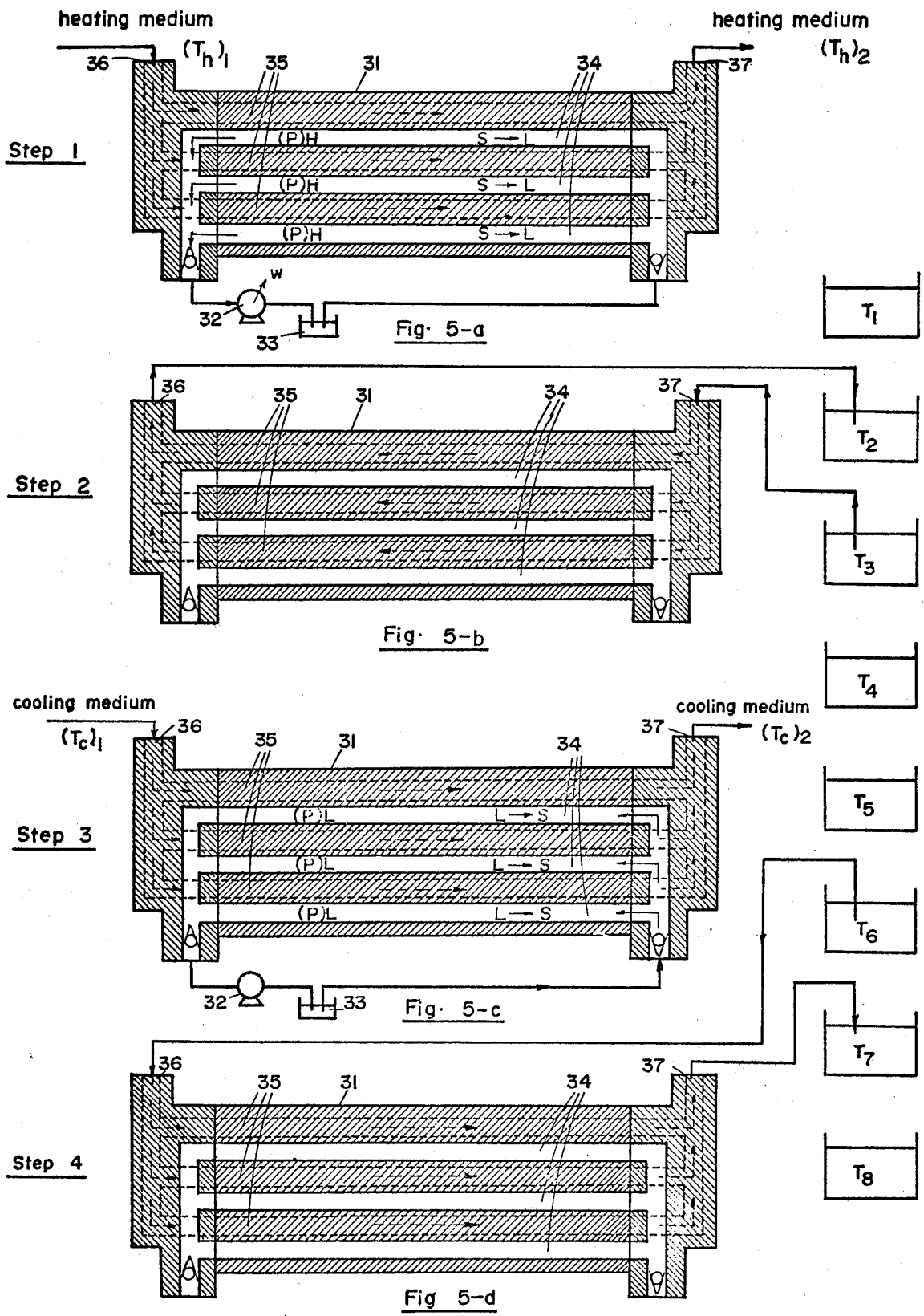

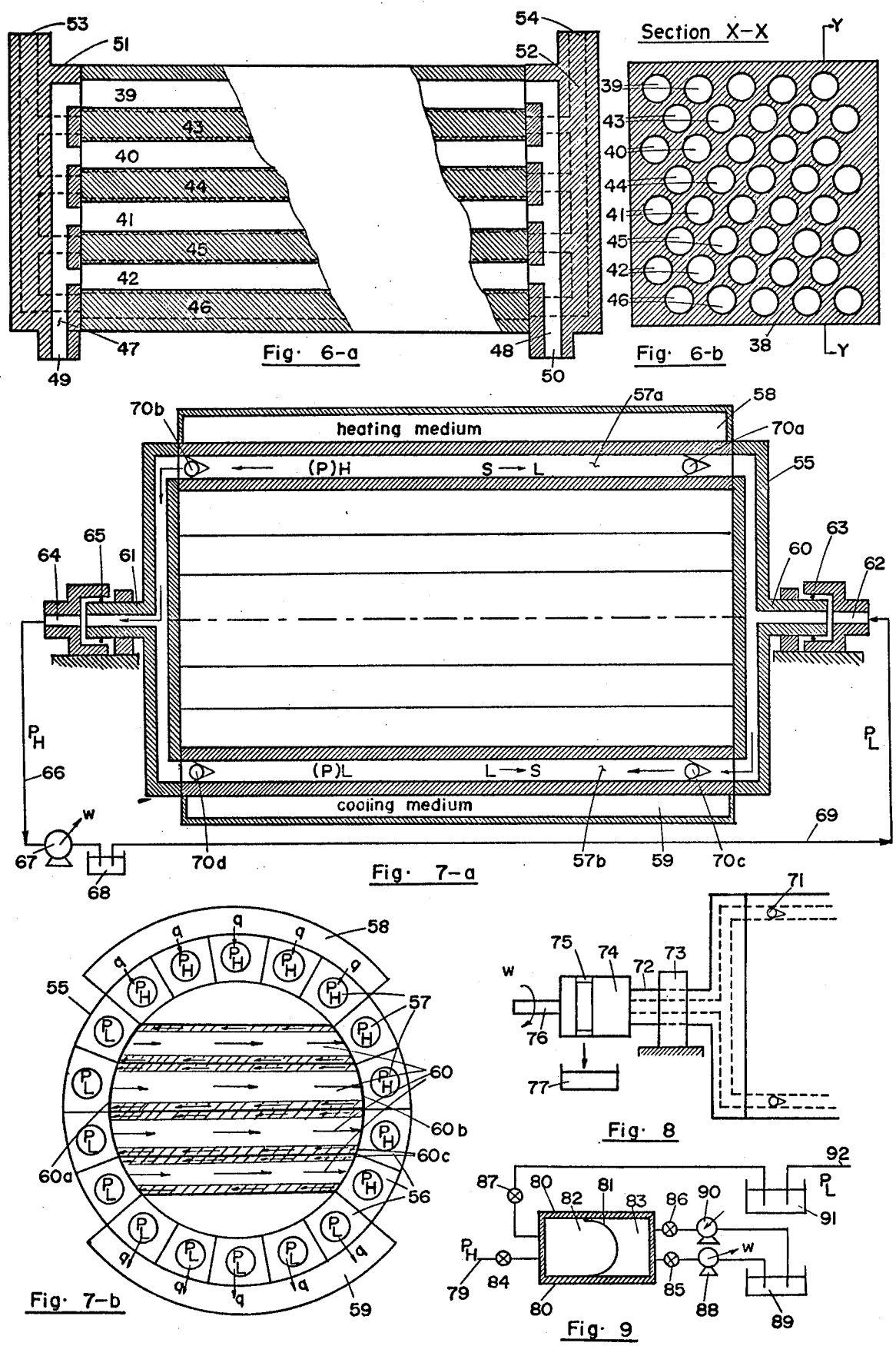

A Heat Pump Utilizing an S/L Type Working Medium

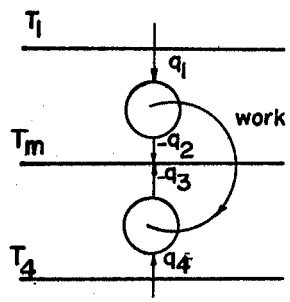
Fig. 14-a
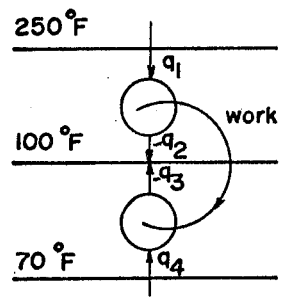
Fig. 14-b
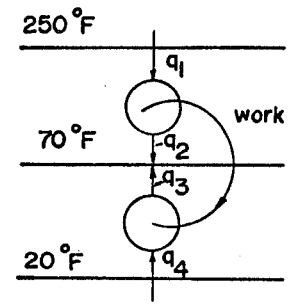
Fig. 14-c
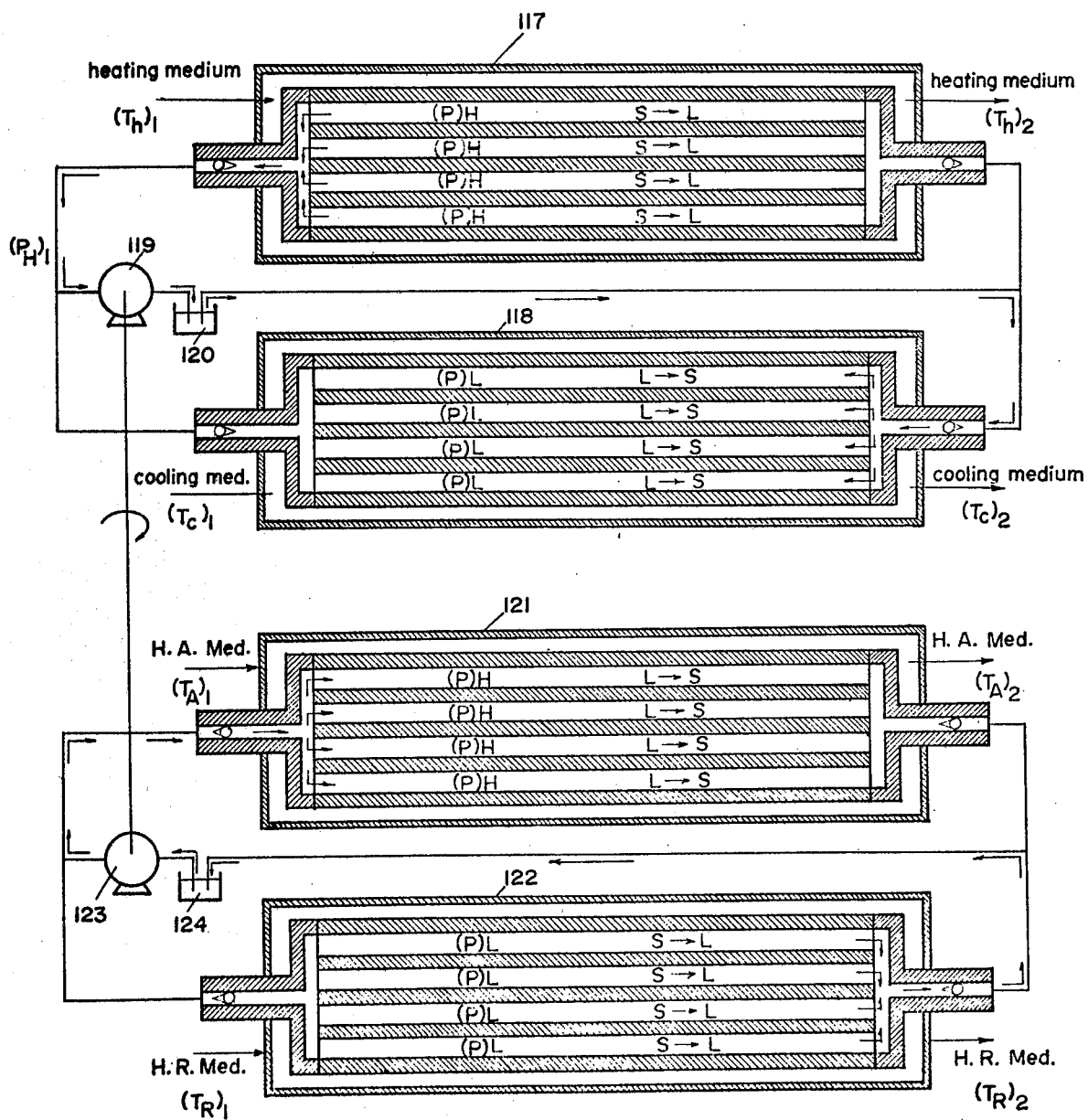
Fig. 15

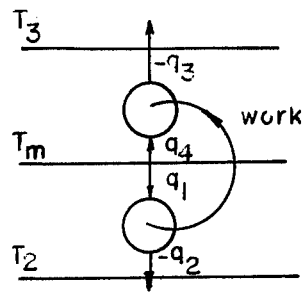
Fig. 16-a
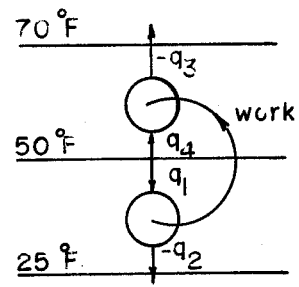
Fig. 16-b
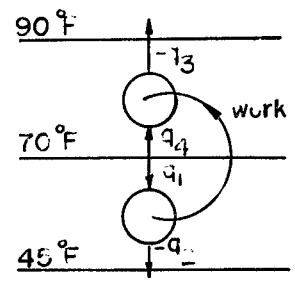
Fig. 16-c
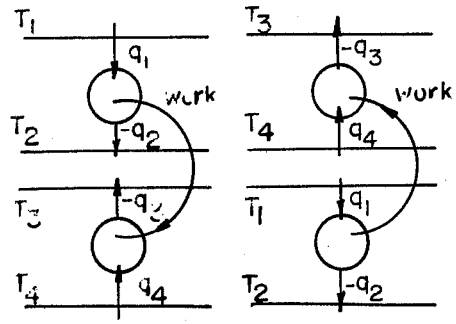
Fig. 17-a    Fig. 17-b
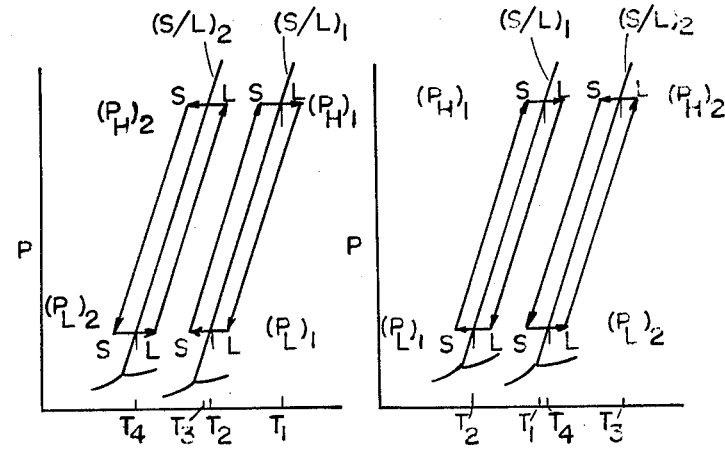
Fig. 18    Fig. 19
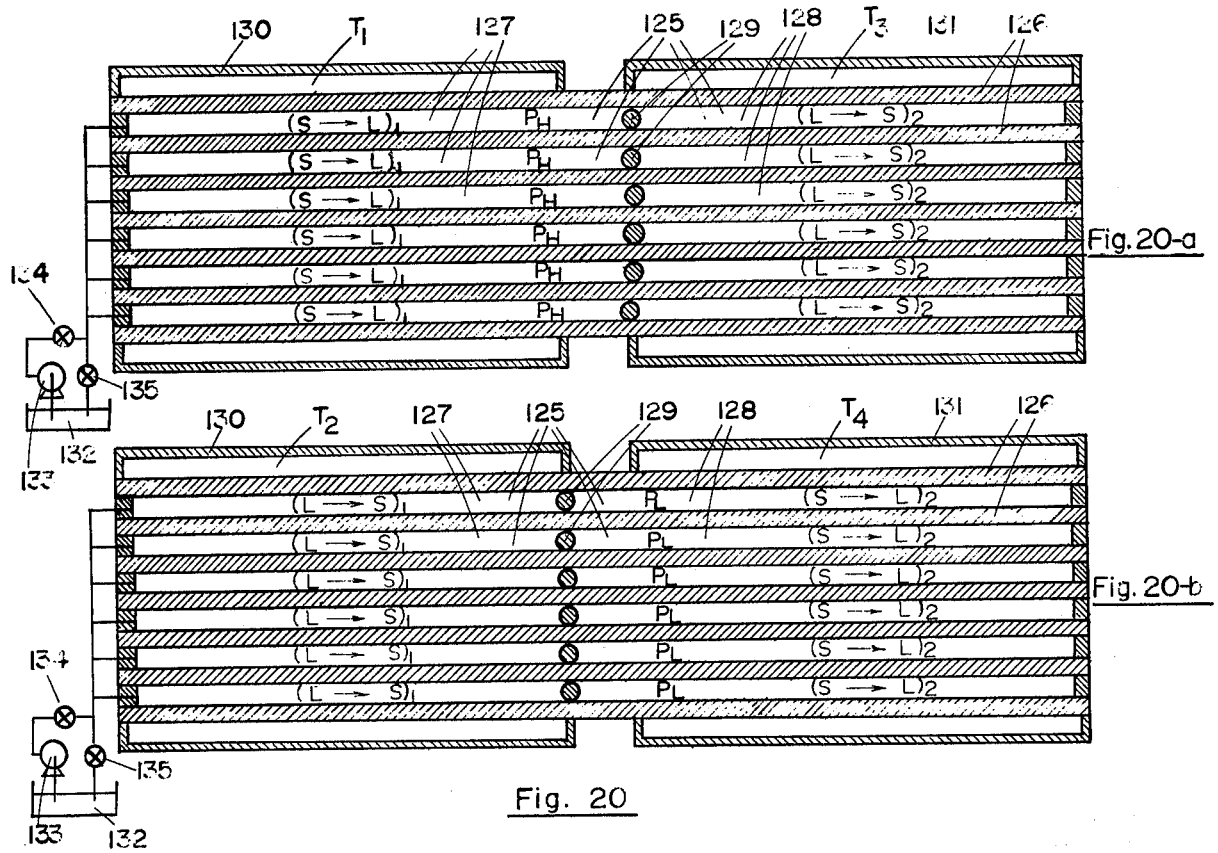
Fig. 20-a
Fig. 20-b
Fig. 20

HEAT ENGINES AND HEAT PUMPS

CROSS-REFERENCES TO OTHER APPLICATIONS

This application is a continuation-in-part application of Ser. No. 474,317 application, filed on May 29, 1974, now U.S. Pat. No. 3,953,973.

BACKGROUND OF THE INVENTION

1. Field of the Invention

The invention relates to a method and apparatus for converting heat energy into work energy and also for pumping heat energy from a low temperature level to a high temperature level. A characteristic feature of the invention is in the use of a working medium which is subjected to a cylcic operation, each comprises of a melting step and a solidification step operated under two pressure levels and at two temperature levels.

2. Brief Description of the Prior Art

In a conventional external heat engine, a working medium, such as water, is generally subjected to a high pressure vaporization operation to absorb heat at a high temperature level, resulting high pressure vapor is depressurized through a turbine to produce work, the exhaust vapor from the turbine is condensed at a low pressure to reject heat at a low temperature level, and finally the condensate is returned to the high pressure vaporization operation described.

In a conventional heat pump, a refrigerator or an air conditioner, a working medium, such as ammonia and Freon, is vaporized at a low temperature level, the low pressure medium vapor is then compressed to a high pressure, the resulting pressurized medium vapor is condensed under the high pressure to release heat at a high temperature level and finally the condensed medium is returned to the low pressure vaporization operation. The efficiencies of these conventional heat engines and heat pumps are generally less than 70% of the theoretical thermodynamic efficiencies.

BRIEF DESCRIPTION OF THE PRESENT INVENTION

The present invention introduces a heat engine, or a heat pump, in which the working medium used is subjected alternatively to solidification and melting operations. A working medium so used is referred to as an S/L type working medium. In a new heat engine with a non-aqueous S/L type medium, the medium is melted under a high temperature $T_H$ and a high pressure $P_H$ to absorb heat and is solidified under a low temperature $T_L$ and a low pressure $P_L$ to release heat. Since the non-aqueous medium expands as it is melted under the high pressure and contracts as it is solidified under the low pressure, the system does work to its surrounding. Since water expands on solidification and contracts on melting in a new heat engine with an aqueous medium, the medium is melted under a high temperature and a low pressure to absorb heat and is solidified under a low temperature and a high pressure to release heat. Since the aqueous medium expands under the high pressure as it is solidified and contracts under the low pressure as it is melted, the system does work to the surrounding. The operation of a heat pump is just the reverse operation of a heat engine. A new engine comprises of multiplicity of longitudinal conduits which are connected through a first check valve to a high pressure zone and through a second check valve to a low pressure zone. Referring to a heat engine utilizing a non-aqueous S/L medium, medium liquid in an amount equivalent to volume expausion associated with the high pressure melting operation is discharged to the high pressure zone through the first check valve from each conduit during a melting step and an equivalent amount of medium enters each conduit during a solidification step through the second check valve. The medium discharged under the high pressure may be depressurized through a hydraulic motor to do work and becomes low pressure medium. For a heat engine utilizing an aqueous S/L medium, medium liquid in an amount equivalent to volume expansion associated with high pressure solidification is discharged to the high pressure zone through the first check valve from each conduit during a solidification step and an equivalent amount of medium enters each conduit during a melting step through the second check valve. A new heat pump is about the same as a new heat engine. The operation of a heat pump is the reverse operation of that of a heat engine and work has to be supplied to the system.

BRIEF DESCRIPTION OF THE DRAWINGS

FIG. 5-$a$ through 5-$d$ illustrate the processing steps.

FIGS. 6-$a$ and 6-$b$ illustrate a new heat engine or a heat pump comprising of a multivoid metal black which contains two sets of conduits, denoted as A-set conduits and B-set conduits. An S/L type working medium is contained in the A-set conduits and is subjected alternatively to a melting operation and a solidification operation as a heating medium and a cooling medium is alternatively passed through the B-set conduits.

FIGS. 7-$a$ and 7-$b$ illustrate another heat engine, or a heat pump, comprising of a rotor which contains a multitude of conduits along its periphery. An S/L type working medium is contained in these conduits. As the rotor rotates, a conduit goes through a preheating zone, a melting zone, a cooling zone and a solidification zone. Referring to FIG. 7-$a$, the rotor is connected to a high pressure zone and a low pressure zone. Medium fluid discharged to the high pressure end is depressurized through a hydraulic motor to do work. Low pressure medium liquid then enters the unit at the low pressure end. FIG. 8 illustrates a direct connection between a hydraulic motor to the high pressure end of the heat engine to eliminate a high pressure rotary seal. FIG. 9 illustrates a barrier vessel to separate the working medium from hydraulic fluid.

FIGS. 14-a through 14-c illustrate that the work that can be obtained from a heat engine operated between $T_1$ and $T_M$ can be used in supplying the work needed in a heat pump pumping heat from $T_4$ to $T_M$. FIG 15 illustrates a work coupling between a heat engine and a heat pump, both utilizing S/L type working mediums. FIGS. 16-a through 16-c illustrate that work that can be obtained from a heat engine operated between $T_M$ and $T_2$ can be used in supplying the work needed in a heat pump pumping heat from $T_M$ to $T_3$. FIG. 17-a illustrates a work coupling between a heat pump operating between temperatures $T_1$ and $T_2$ and a heat pump operating between temperatures $T_3$ and $T_4$. Similarly, FIG. 17-b illustrates a work coupling between a heat pump that operates between temperatures $T_1$ and $T_2$ a heat pump that operates between temperatures $T_3$ and $T_4$. FIGS. 18 and 19 respectively illustrate the operations of the combined heat-engine heat pump units illustrated by FIGS. 17-a and 17-b. FIG. 20 illustrates a unique combined heat engine-heat pump unit in which the work coupling between an expanding fluid and a shrinking fluid is accomplished by a floating divider.

DESCRIPTION OF PREFERRED EMBODIMENTS OF THE INVENTION

The present invention introduces a heat engine, or a heat pump, in which the working medium used is subjected alternatively to solidification and melting operations. A working medium so used is referred to as an S/L type working medium. For a normal substance, the solid is denser than the liquid. Therefore, a normal substance expands as it is melted and contracts as it is solidified. It is for few cases, water, bismuth and gallium, that the liquid is denser than the solid. Such an abnormal substance expands as it is solidified and contracts as it is melted. In the present disclosure, S/L type working mediums are classified into non-aqueous mediums and aqueous mediums which are respectively used to mean the normal substances and abnormal substances. Throughout most part of the present disclosure, the use of a non-aqueous medium is assumed. The modifications needed in the equipment and operational procedures when an aqueous medium is used are discussed. Since the operation of a new heat pump is just the reverse operation of a new heat engine, its operation will be obvious to one skilled in the art. Therefore, the major part of the present disclosure will be devoted to the principle of operation, construction and operational procedures of new heat engines.

The main objective of the present invention is in developing an efficient heat engine which can make use of low grade heat energy, i.e. heat energy that is available at a low temperature level such as waste heat and solar energy. Another objective is to develope a heat pump having a high thermodynamic efficiency. Still another objective is to develope a heat engine-heat pump combination with work coupling between a heat engine and a heat pump. Such a combined heat engine-heat pump may be useful for house heating and house cooling.

The melting point of a substance varies with applied pressure according to the clapeyron-clausius equation. Melting point of the abnormal substances, such as water, bismuth and gallium are lowered as the applied pressure is increased. Melting points of normal substances increase as the applied pressure is increased. Table 1 shows $dP/dT$ values for the melting curves of various substances (1).

Figure 1:
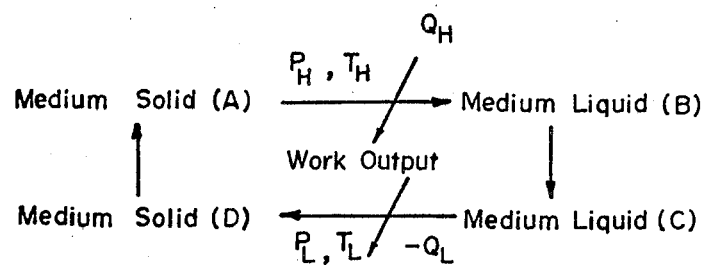
FIG. 1 illustrates the principle of operation of a new heat engine utilizing a non-aqueous S/L type medium. It shows that the medium is subjected to a cyclic operation: it is melted under a high temperature $T_H$ and a high pressure $P_H$ and the medium is then solidified under a low temperature $T_L$ and a low pressure $P_L$.
Figure 2:
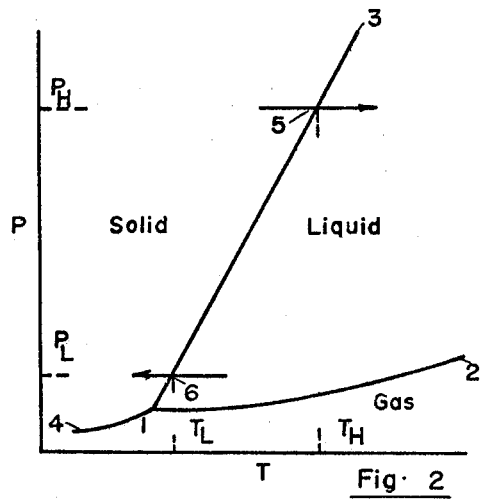
FIG. 2 and FIG. 3 respectively illustrate the principle of a new heat engine utilizing a non-aqueous S/L type medium on a P-T diagram and a P-V diagram.
Figure 3:
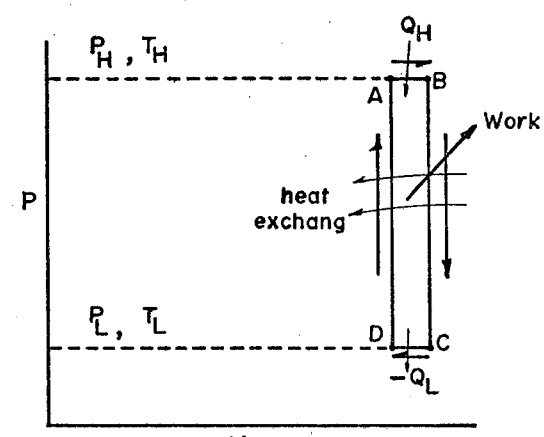

FIG. 1 illustrates the principle of operation of a new heat engine utilizing a non-aqueous and normal S/L type medium. FIG. 2 schematically illustrates the phase diagram (P-T diagram) of the normal working medium, density of solid being higher than that of liquid. It shows the triple point 1, the vaporization line 1–2, the melting line 1–3, and the sublimation line 4–1. Referring to points 5 and 6, the medium is to be subjected to a cyclic operation comprising of a high pressure $P_H$ high temperature $T_H$ melting step and a low pressure $P_L$ low temperature $T_L$ solidification step. FIG. 3 shows a P-V diagram of the medium and shows the volume changes at points 5 and 6 and along line 5–6 of FIG. 2.

Referring to FIGS. 1, 2 and 3, the medium in the heat engine undergoes a cyclic operation which comprises of four steps; viz. A-B, B-C, C-D and D-A. During the first step, the medium solid (A) is melted to become medium liquid (B) under a high pressure $P_H$ and a high temperature $T_H$ by absorbing heat $Q_H$. The valume expands during this step. During the second step, the medium liquid (B) is depressurized and cooled to $P_L$ and $T_L$ and becomes medium liquid (C). During the third step, the medium liquid (C) is solidified by releasing heat $(-Q_L)$ under a low pressure $P_L$ and a low temperature $T_L$ and becomes medium solid (D). The medium contracts during this step. The medium solid (D) is then pressurized from $P_L$ to $P_H$ and heated from $T_L$ to $T_H$ and becomes medium solid (A). The next cycle is then initiated. The engine does work by expanding under the high pressure $P_H$ and contracting under the low pressure $P_L$.

Table 1

| Substance | Normal Melting Point (° C) | P/T (atm./° C) |
|---|---|---|
| Water | 0 | −100 |
| Methane | −182.49 | +39 |
| Ethylene | −169.5 | +70 |
| Benzene | 5.50 | +37 |
| P-xylene | 13.2 | +29 |
| Bibenzyl | 51.8 | +34 |
| Cyclohexane | 6.55 | +19 |
| Carbon Tetrachloride | −22.95 | +28 |
| Ethylene DiBromide | 9.95 | +40 |
| o-Dichlorobenzene | 53.15 | +28 |
| p-dibromobenzene | 87.3 | +27.5 |
| Cetyl Alcohol | 49.10 | +43 |
| Acetic Acid | 16.55 | +48.5 |
| Bromobenzene | −5.50 | +53 |
| n-Caproic Acid | −3.9 | +55 |

($\frac{\Delta P}{\Delta T}$) Values for the Melting Curves of Various Substances At least a part of the heat released in cooling the medium liquid from $T_H$ to $T_L$, from state B to state C, may be utilized in heating the medium solid from $T_L$ to $T_H$, from state D to state A.

When an abnormal substance such as an aqueous solution is used as working medium, the process description given above has to be modified. For such a medium, the volume expands as it is solidified and the volume contracts as it is melted and the melting line in FIG. 12 has negative slope. The medium therefore melts at a lower temperature under a higher applied pressure. In such case, the medium in the heat engine undergoes a cyclic operation which comprises of four steps: viz. A-B, B-C, C-D and D-A. During the first step, the medium solid (A) is melted under a low pressure $P_L$ and under a high temperature $T_H$ to become medium liquid (B) by absorbing heat $Q_H$. The volume of the medium contracts during this step. During the second step, the medium liquid (B) is pressurized to $P_H$ and cooled to $T_L$ and becomes medium liquid (C). During the third step, the medium liquid (C) is solidified by releasing heat $(-Q_L)$ under a high pressure $P_H$ and a low temperature $T_L$ and becomes medium solid (D). The medium expands during this step. The medium solid (D) is then depressurized from $P_H$ to $P_L$ and heated from $T_L$ to $T_H$ and becomes medium solid (A). The next cycle is then initiated. This engine also does work by expanding under the high pressure $P_H$ and contracting under the low pressure $P_L$. Again, at least a part of the heat released in cooling the medium liquid from state B to state C may be utilized in heating the medium solid from state D to state A.

Figure 4:
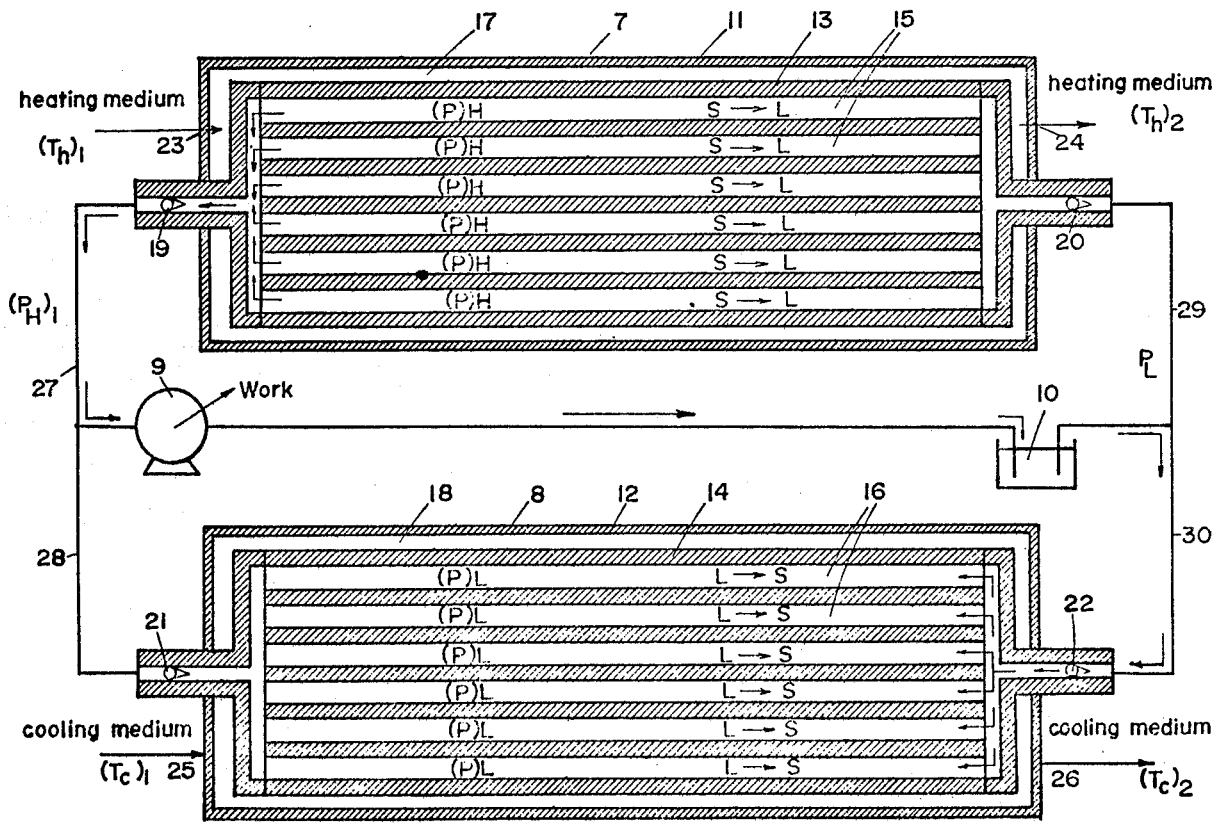
FIG. 4 illustrates the construction and operation of a new heat engine. Referring to the figure, a new heat engine comprises of a multiplicity of longitudinal conduits which can sustain a high pressure and are in fluid communication with a high pressure zone through a first check valve and are in fluid communication with a low pressure zone through a second check valve. Medium fluid discharged to the high pressure zone is depressurized through a hydraulic motor to do work.

Detailed operational procedures are presented by referring to FIG. 4 and FIGS. 5-a through 5-d. Two types of heat engines are illustrated by FIGS. 6-a and 6-b and FIGS. 7-a and 7-b respectively. The description is made by referring to a heat engine utilizing a normal working medium. The operation of a heat engine utilizing an abnormal medium, such as an aqueous solution, will be obvious to a person skilled in the art and will be omitted.

FIG. 4 shows two heat engine units 7 and 8, a hydraulic motor or a turbine 9 and a medium storage tank 10. The two heat engine units 7 and 8 respectively comprise of outer vessels 11 and 12, multivoid metal blocks 13 and 14 containing multitude of conduits 15 and 16 which contain an S/L type working medium and are connected to a high pressure lines 27 and 28 through check valves 19 and 21 respectively and are connected to a low pressure lines 29 and 30 through check valves 20 and 22 respectively. The medium in each heat engine unit undergoes the four steps described earlier. As shown in the figure, a heating medium is passed through the first unit from 23 to 24, to cause a high temperature and high pressure melting of the medium. A volume of medium in equivalent to the volume expansion associated with the melting operation is discharged through the check valve 19 and the high pressure line 27 and depressurized through the hydraulic motor 9 to do work. The depressurized medium liquid is stored in the medium tank 10. A cooling medium is shown to be passed through the second unit from 25 to 26 to cause a low temperature low pressure solidification of the medium. A volume of medium in equivalent to the volume constraction associated with the solidification operation enters from the medium tank through the low pressure line 30 and through the check valve 22 and into the conduits of the unit. The functions of the two units alternate. The second step (B-C) and the fourth step (D-A) are not illustrated in FIG. 4 but are illustrated in FIGS. 5-b and 5-d.

FIGS. 5-a, 5-b, 5-c and 5-d respectively illustrate steps A-B, B-C, C-D and D-A described earlier that are conduced in a multivoid heat engine. The figures illustrate a multivoid heat engine unit 31, a hydraulic motor 32, a medium storage tank 33 and tanks containing intermediate heat exchange mediums at intermediate temperatures $T_1$, $T_2$, — $T_8$ between $T_H$ and $T_L$. The heat engine unit 31 contains two sets of conduits 34 and 35. The first set of conduits contains a normal S/L type working medium. The second set of conduits are to be used for passing a heating medium, a cooling medium and intermediate heat exchange mediums. During the first step, step A-B, a high temperature $(T_h)_1$ heating medium enters the conduits 35 from entrance 36 and exits at the exit 37 at $(T_h)_2$. The medium in the conduits 34 is melted under a high pressure $P_H$ and a high temperature $T_H$. A quentity of medium liquid is discharged at the high pressure and depressurized through the hydraulic motor 32 and stored in the medium tank 33. Tanks $T_1$ through $T_8$ store intermediate heat exchange mediums at temperatures $T_1$ through $T_8$ which are intermediate temperatures between $T_H$ and $T_L$. During the second step, step B-C, intermediate heat exchange medium at $T_2$ is passed through the unit and be heated to $T_1$ and stored in tank $T_1$, then intermediate heat exchange medium at $T_3$ is passed through the unit and be heated to $T_2$ and stored in tank $T_2$ etc., till finally, heat exchange medium at $T_8$ is passed through the unit and is heated to $T_7$ and stored in tank $T_7$. By this time, the medium in the unit is cooled down to $T_L$ and the second step is completed. During the third step, step C-D, a cooling medium enters at $(T_c)_1$ and at 36 and leaves at $(T_c)_2$ and at 37 to solidify the medium at a low temperature $T_L$ and under a low pressure $P_L$. A quantity of low pressure medium enter the conduits 34 to compensate for the volume shrinkage associated with the solidification of the medium. During step 4, step D-A, intermediate heat exchange mediums at $T_1$, $T_2$, — $T_7$ are successively passed through the unit to heat the medium in the unit from $T_L$ to $T_H$ and respectively become mediums at $T_2$, $T_3$, — $T_8$ and are respectively stored in tanks $T_2$ through $T_8$. The operations described are repeated.

FIGS. 6-a and 6-b respectively illustrate a longitudinal cross-section and a transverse cross-section of a stationary type new heat engine. It comprises of a multivoid metal block and headers with manifold means 47, 48, 51 and 52 at each end. The multivoid contains a first set of conduits 39, 40, 41 and 42 and a second set of conduits 43, 44, 45 and 46. The first set of conduits is used to contain an S/L type working medium and a heating medium, intermediate heat exchange mediums and a cooling medium are to pass through the second set of conduits to cause the working medium to undergo the four steps, viz. A-B, B-C, C-D and D-A, described. One exit 49 of the first set of conduits is to be connected through a check value to a high pressure line and to a hydraulic motor, and the other exit 50 of the first set of conduit is to be connected through a check valve to a low pressure line and to a medium storage tank. Inlet and outlet 53 and 54 to be second set of conduits are also provided at the two headers.

FIGS. 7-a and 7-b respectively illustrate a longitudinal cross-section and a transverse cross-section of a rotary type new heat engine. It comprises of a rotor 55 with two rotary headers and trunious 60 and 61, a stationary inlet 62 with a rotary seal 63, a stationary outlet 64 with a rotary seal 65, a conduit for the passage of a heating medium 58 a conduit for the passage of a cooling medium 59, heat exchange compartments 60, a hydraulic motor 67 and a medium storage 68. The rotor 55 may be divided into multitude of segments 56; each segment contains a longitudinal conduit which contains an S/L type working medium and each conduit is provided with two check valves, 70a and 70b, one at each end.

Referring to FIG. 7-b, the rotor is to be rotated counter clockwise. As the rotor is rotated, the medium in each conduit successively goes through a high pressure melting zone 58, an intermediate cooling zone, a low pressure solidification zone 59, and an intermediate heating zone. The changes of the medium in these steps correspond to steps A-B, B-C, C-D and D-A respectively. Each segment of the intermediate heat exchange zone may be made to function as a heat siphon tube to cause heat exchange between the medium in the left hand conduits to the medium in the right hand conduits. Each heat exchange segment contains a heat exchange medium, which vaporizes at the left end and condense at the right end to assist heat exchange between the conduits in the left to the conduits in the right. While a conduit is in the heating zone, the medium therein is melted under a high pressure, and an amount of the medium equivalent to volume expansion due to the melting is discharged from the conduit through the left hand check valve 70b and discharge into the high pressure line 66 and through the hydraulic motor and depressurized. While a conduit is in the cooling zone, the medium therein is solidified under a low pressure, and an amount of medium enters the conduit through the right hand check valve 70c to compensate for the volume shrinkage. The engine does work at the hydraulic motor 67.

Some operational difficulty may be experienced at the high pressure rotary seal 65. Referring to FIG. 8, such a high pressure rotary seal may be avoided by installing a hydraulic motor 74 directly to the trunion 72 of the rotor. Useful work is obtained at shaft 76 and depressurized medium is collected into a medium tank 77.

Medium liquid may not have sufficient lubricating property to be admitted to a hydraulic motor. In that case the high pressure medium liquid obtained in a high pressure melting operation may be used to pressurize and displace a hydraulic oil, which in turn may be used to actuate a hydraulic motor. Referring to FIG. 9, with valves 86 and 87 in closed positions, high pressure medium liquid enters a barrier tank 80 provided with a bladder 81 through inlet 79 and valve 84 to displace hydraulic oil through 83 and valve 85 and through a hydraulic motor 88. This operation is stopped before the bladder reaches the right end. Valves 84 and 85 are then closed and hydraulic oil is pumped into the right hand compartment 83 of the barrier tank through a low head pump 90 and valve 86 to displace the medium liquid out of the barrier tank and through valve 87 into a medium storage tank 91. Medium may be taken from the tank to supply medium into a conduit in which medium is being solidified.

Figure 10:
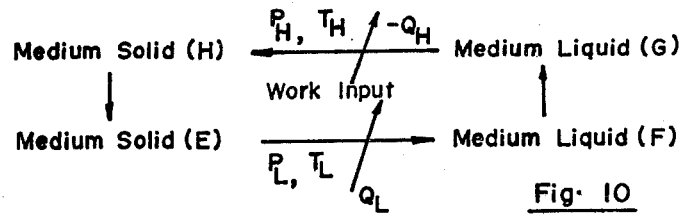
FIG. 10 illustrates the principle of operation of a new heat pump utilizing a non-aqueous S/L type medium. It shows that the medium is subjected to a cyclic operation: The medium is melted under a low temperature $T_L$ and a low pressure $P_L$ and the medium is then solidified under a high temperature $T_H$ and a high pressure $P_H$. Heat is thus absorbed at $T_L$ and released at $T_H$ and work is supplied to accomplish this heat pumping.
Figure 11:
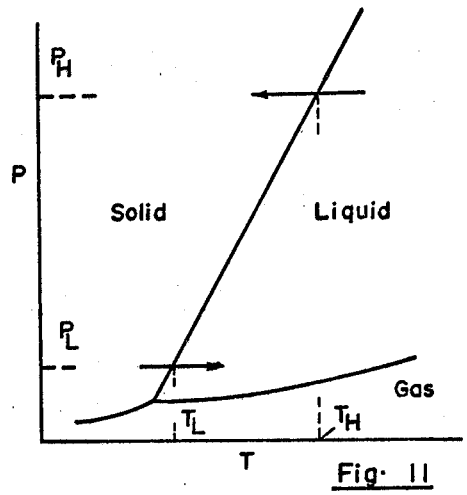
FIGS. 11 and 12 respectively illustrate the principle of a new heat pump utilizing a non-aqueous S/L type medium on a P-T diagram and a P-V diagram.
Figure 12:
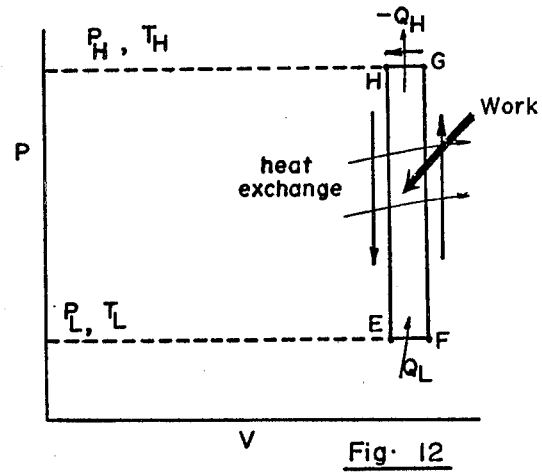

FIG. 10 illustrates the principle of operation of a new heat pump utilizing a normal S/L type working medium, the melting point of which increases as the applied pressure increases. FIGS. 11 and 12 further illustrate the principle of the new heat pump by referring to a P-T diagram and P-V diagram of the medium respectively. In operating the heat pump, the medium is subjected to a cyclic operation comprising of four steps; viz E-F, F-G, G-H, and H-E. During the first step, E-F, the medium solid (E) is melted to become medium liquid (F) under a low pressure $P_L$ and a low temperature $T_L$ to absorb heat $Q_L$. The medium expands during this period. During the second step, F-G, the medium liquid (F) is pressurized and heated to become medium liquid (G). During the third step, the medium liquid (G) is solidified by releasing $(-Q_H)$ under a high pressure $P_H$ and at a high temperature $T_H$ and becomes medium solid (H). The medium contracts and work has to be applied to the medium at the high pressure during this step. During the fourth step, the medium solid (H) is depressurized from $P_H$ to $P_L$ and cooled from $T_H$ to $T_L$ and becomes medium solid (E). The next cycle is then initiated. Work has to be supplied to the medium to carry out the above described cyclic operations. It is noted that the operational procedures of a heat pump is the reverse operations of that of a heat engine.

When an abnormal S/L medium, such as an aqueous medium, is used as a working medium, the process description given above has to be modified, because the medium expands as it is solidified and contracts as it is melted. For such a medium, the melting line in FIG. 11 has a negative slope and the medium melts at a lower temperature under a higher applied pressure. When such an abnormal medium is used, the four steps, E-F, F-G, G-H and H-E should be modified as follows: (1) During the first step, E-F, the medium solid (E) is melted to become medium liquid (F) under a high pressure $P_H$ and a low temperature $T_L$ by absorbing heat $Q_L$. The medium contracts and work has to be done to the medium during this step. (2) During the second step, F-G, the medium liquid (F) is depressurized and heated to become medium liquid (G). (3) During the third step, G-H, the medium liquid (G) is solidified to become medium solid (H) under a low pressure $P_L$ and at a high temperature $T_H$ by releasing heat $-Q_H$. (4) During the fourth step, H-E, the medium solid (G) is pressurized and cooled to become medium solid (E).

Figure 13:
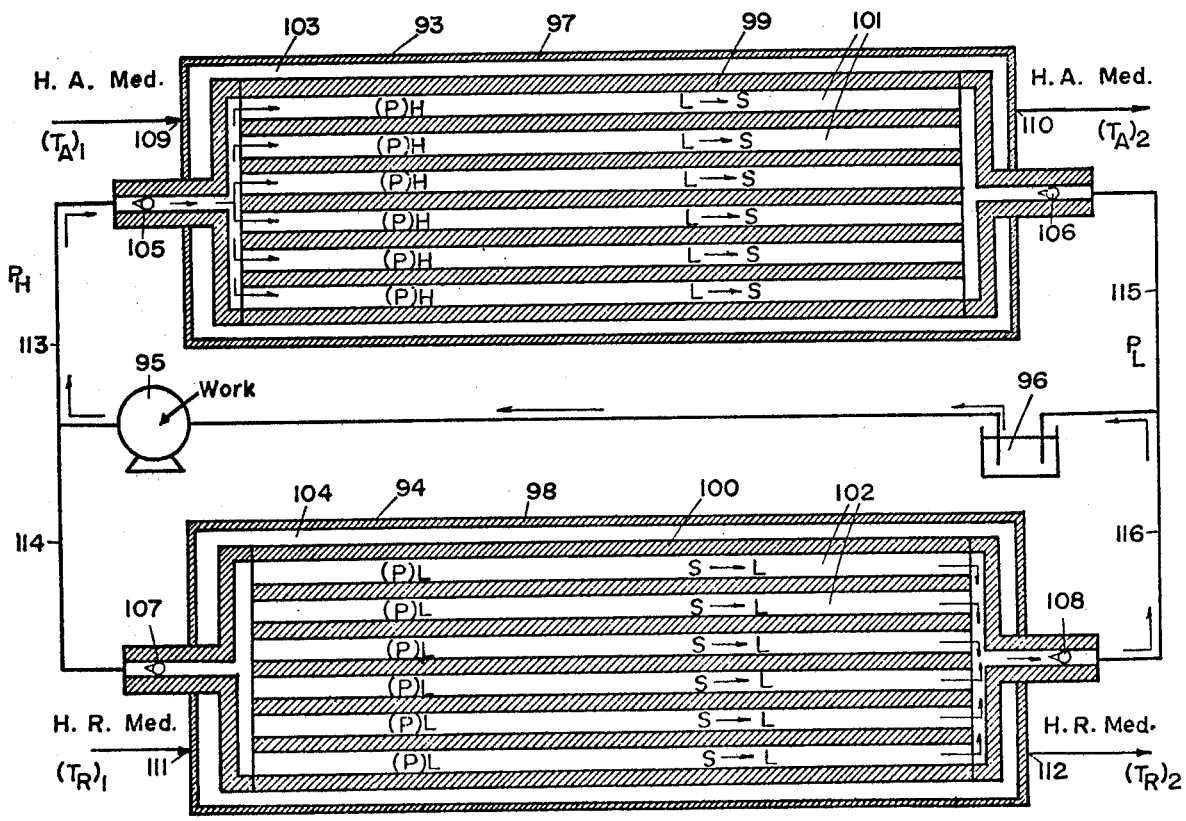
FIG. 13 illustrates the construction and operation of a new heat pump. The operation of a new heat pump is just the reverse operation of that of a new heat engine.

Detailed operational procedures of a new heat pump are presented by referring to FIG. 13. The description is made by referring to a heat pump utilizing a normal working medium. The operation of a heat pump which uses an abnormal medium will be obvious to a person skilled in the art and will not be described. FIG. 13 shows two heat pump units 93 and 94, a hydraulic pump 95 and a medium storage tank 96. The two heat pump units 93 and 94 respectively conprise of outer vessels 97 and 98, multivoid metal blocks 99 and 100, containing multitude of conduits 101 and 102 which contain a normal S/L medium and are connected to high pressure lines 113 and 114 through check valves 105 and 107 respectively and are connected to low pressure lines 115 and 116 through check valves 106 and 108 respectively. The medium in each heat pump unit undergoes the four steps described above. As shown in the figure, the medium in the first unit is undergoing the high pressure solidification step and the medium in the second unit is undergoing the low pressure melting step. A quantity of medium is shown to be pressurized through the hydraulic pump and enters the first unit to compensate for the volume shrinkage associated with the solidification operation. A quantity of the medium in the second unit is shown to be discharged from the second unit as the medium is melted. Heat exchange operation between the second step, F-G and the third step, H-E, is not illustrated, but is similar to what has been described in connection with the operation of a heat engine.

FIG. 14-a illustrates a work coupling between a heat engine and a heat pump. It shows that a heat engine which absorbs heat $q_1$ at a temperature $T_1$ and releases heat $(-q_2)$ at a temperature $T_M$, $T_1$ being higher than $T_m$, may supply the work needed in a heat pump which absorbs heat $q_4$ at a temperature $T_4$ and releases heat $(-q_3)$ at the said temperature $T_m$, $T_4$ being lower than $T_m$. Solar heating and cooling have arose great interest recently. FIGS. 14-b and 14-c respectively illustrate how the work-coupling between a heat engine and a heat pump may be adopted in house cooling and house heating respectively. Let us assume that heat energy has been made available at 250° F by solar energy collector or by some other means and we are interested in cooling and heating a house efficiently. For house cooling, let use assume that the ambient temperature is 100° F and a house is to be maintained at 70° F. One can use a heat engine which absorbs heat $q_1$ from the heat source at 250° F and rejects heat $-q_2$ at the ambient temperature 100° F and use the work so obtained to run a heat pump which pumps heat $q_4$ out from the house maintained at 70° F and rejects heat $-q_3$ to the ambient temperature 100° F. The heat removed from the house is $q_4$. For house heating, let us assume that the ambient temperature is 20° F and a house is to be maintained at 70° F. One can use a heat engine which absorbs heat $q_1$ from the heat source at 250° F and rejects heat $-q_2$ to the house temperature maintained at 70° F to provide the work needed in running a heat pump which pumps heat $q_4$ from the ambient temperature 20° F and rejects heat $-q_3$ at the house temperature. Therefore, the heat received by the room is $q_2 + q_3$. Should a conventional direct heating be used, the amount of heat ulilized in the house heating would be $q_1$. The amount of heat made available for house heating in this way, $q_2 + q_3$, is several times of that of a direct heating, $q_1$. For an ideal operation, the relations between $q_1$, $q_2$, $q_3$ and $q_4$ can be evaluated from Carnot's Engine equations. Therefore, $$(-q_2/q_1) = (T_m/T_1) \text{ and } (-q_3/q_4) = (T_m/T_4)$$

where $T_1$, $T_m$, and $T_4$ are in absolute temperatures. Of course, there is some degree of non-ideality involved in any heat engine and heat pump. However, it is noted that the efficiencies of a new engine and a new heat pump described are better than those of a conventional heat engine and a conventional heat pump.

FIG. 15 illustrates the work coupling between a heat engine and a heat pump. The figure shows two heat engine units 117 and 118 with a hydraulic motor 119 and two heat pumps units with a hydraulic pump 123. The heat engine units are heated by a heating medium which operates between $(T_h)_1$ and $(T_h)_2$ and cooled by a cooling medium which operated between $(T_c)_1$ and $(T_c)_2$ and actuate the hydraulic motor 119. The heat pump units which absorb heat from a heat rejecting medium (H.R. medium) which operates between $(T_R)_1$ and $(T_R)_2$ and release heat to a heat absorbing medium (H. A. medium) which operates between $(T_A)_1$ and $(T_A)_2$ and receive work through the hydraulic pump 123. The work performed by the hydraulic motor 119 is utilized in supplying the work needed in the hydraulic pump 123.

In selecting a working medium to be used in a new heat engine or heat pump, the factors to be considered are (1) the operating temperature range, (2) normal melting point of the medium, (3) $\Delta P/\Delta T$ of the melting curve, (4) latent heat of melting, (5) $\Delta V$ associated with the phase change, and (6) cost and availability. The cost of a heat engine or a heat pump is related to the operating pressure which determines the wall thickness of the medium containing conduits. The operating pressure is related to the operating temperature range, the normal melting point of the medium and $(\Delta P/\Delta T)$ of the melting curve of the medium. The melting point of the medium under the highest operating pressure $T_H$ can be evaluated as $$T_H = T_M + \frac{1}{\frac{\Delta P}{\Delta T}} \times (\Delta P)_{max.}$$

where $T_M$ is normal melting point of the medium, $(\Delta P)_{max.}$ is the maximum operating pressure minus the normal pressure, and $(\Delta P/\Delta T)$ is the slope of the melting point curve of the medium. The operating temperature range must be within the range $T_M$ to $T_H$, Table 1 is a list of $(\Delta P/\Delta T)$ values for various substances. For a heat engine or heat pump to be operated between 10° C to 100° C, one may use cyclohexane as its working medium, the maximum operating pressure is found to be $$P_H = 1 \text{ atm} + 19 \frac{\text{atm}}{°C} \times (100 - 6.55) °C$$
$$= 1776 \text{ atm.}$$

Since the wall thickness of a conduit required to sustain a given high pressure decreases as the conduit diameter decreases, and since the conduit surface area available for heat transfer increases as the conduit diameter decreases, it is advantageous to use a heat pump unit or a heat pump unit with a small conduit diameter. The economy improves greatly as the conduit diameter is decreased to say less than ¼ inch, or even less than ⅛ inch.

Finally, it is noted that a heat engine of this type can be utilized in recovering work from low grade heat sources, such as heat energy usually associated with thermal pollution, geothermal energy, and solar energy collected.

FIG. 16-a again illustrates a work coupling between a heat engine and a heat pump. It shows that a heat engine that absorb heat $q_1$ at temperature $T_m$ and release heat $(-q_2)$ at temperature $T_2$, $T_m$ being higher than $T_2$, may supply the work needed in a heat pump which absorbs heat $q_4$ at temperature $T_m$ and release heat $(-q_3)$ at temperature $T_3$, $T_3$ being higher than $T_m$. This scheme is very useful in heating a house during winter and cooling a house during summer by making use of variation in the ambient temperature. Assuming that, during a winter day, the day-time temperature is somewhat higher than 50° F and the night-time temperature is somewhat lower than 25° F, one may use a heat storage to store heat at 50° F during the day time and use the scheme illustrated by FIG. 16-b to heat the house at 70° F during the night time. In the operation, a part of the heat $q_1$ taken from the heat storage is used to actuate a heat engine and reject heat $(-q_2)$ to the ambient air. The work so obtained is then used to pump heat $q_4$ from the heat storage at 50° F and supply heat $(-q_3)$ at 70° F to the house. Assuming that, during a summer day, the day-time temperature is lower than 90° F and the night temperature is lower than 45° F, one may store the "Cold" of the night by cooling a cold storage and use the scheme illustrated by FIG. 16-c to remove heat from the house at 70° F and discharge heat to the ambient air at 90° F. In this operation, a part of the heat removed from the house $q_1$ is used to actuate a heat engine and reject heat $(-q_2)$ to the cold storage at 45° F. The work is used to actuate a heat pump which remove heat from the house $q_4$ and discharge heat $(-q_3)$ to the ambient air.

A work coupling can be accomplished between a heat engine operated between any two temperatures and a heat pump operated between any two temperatures. Therefore, in a more general discussion of the operation of a combined heat engine-heat pump, four temperature levels are involved. FIG. 17-a illustrates work compling between a heat pump operated between temperatures $T_1$ and $T_2$ and a heat pump operated between $T_3$ and $T_4$, the four temperatures being in a descending sequence of $T_1 > T_2 > T_3 > T_4$. The system illustrated by FIG. 14-a is a special case of a system illustrate by FIG. 17-a. In other words, when the low temperature level of the heat engine and the high temperature level of the heat pump of a system illustrated by FIG. 17-a equal, it becomes a system illustrated by FIG. 14-a. FIG. 17-b illustrates work coupling between a heat engine operated between temperatures $T_1$ and $T_2$ and a heat pump operated between $T_3$ and $T_4$, the four temperatures being in a decending sequence of $T_3 > T_4 > T_1 > T_2$. A system illustrated by FIG. 16-a is a special case of a system illusted by FIG. 17-b in the way similar to the relations between systems represented by FIG. 14-a and FIG. 17-a. In an even more general combined heat engine-heat pump system, the operating temperature range of the heat engine may overlap with the operating temperature range of the heat pump. This is the case when the four temperatures in the scheme illustrated by FIG. 17-a are in the descending sequence of $T_1 > T_3 > T_2 > T_4$. This is also the case when the four temperatures in the scheme illustrated by FIG. 17-b are in the descending sequence of $T_3 > T_1 > T_4 > T_2$. It is noted the discussions made about the work coupling illustrated in FIGS. 14-a through 14-c and the equipment illustrated by FIG. 15 apply to any combined heat engine-heat pump described.

For a combined heat engine-heat pump using properly selected S/L type working mediums and operated between properly selected temperature ranges, the pressure ranges through which the heat engine and the heat pump operate may become substantially the same. FIG. 18 illustrates the operation of a system illustrated by FIG. 17-a with the provisions just described on a P-T diagram. The heat engine operates between $T_1$ and $T_2$ using a first (S/L)-type working medium whose melting curve is shown as $(S/L)_1$ line. The heat pumpoperates between $T_3$ and $T_4$ using a second (S/L)-type working medium whose melting curve is shown as $(S/L)_2$ line. The first medium melts at $(P_H)_1$ and $T_1$ and solidifies at $(P_L)_1$ and $T_2$; the second medium solidifies at $(P_H)_2$ and $T_3$ and melts at $(P_L)_2$ and $T_4$. It is shown in the figure that $(P_H)_1$ is equal to $(P_H)_2$ and $(P_L)_1$ is equal to $(P_L)_2$. FIG. 19 illustrates the operation of a system illustrated by FIG. 17-b with the provisions described on a P-T diagram. The heat pump operates between $T_3$ and $T_4$ using a second (S/L)-type working medium whose melting curve is shown as $(S/L)_2$ line. The heat engine operates between $T_1$ and $T_2$ using a first (S/L)-type working medium whose melting curve is shown as $(S/L)_1$ line. The first medium melts at $(P_H)_1$ and $T_1$ and solidifies at $(P_L)_1$ and $T_2$; the second medium solidifies at $(P_H)_2$ and $T_3$ and melts at $(P_L)_2$ and $T_4$. As shown in the figure, $(P_H)_1$ is equal to $(P_H)_2$ and $(P_L)_1$ is equal to $(P_L)_2$.

FIG. 20 illustrates a unified heat engine-heat pump using (S/L)-type working mediums in which the medium used in the heat engine does work on the medium used in the heat pump through a floating divider. The use of the unit is illustrated by showing how the operations illustrated by FIG. 18 and 19 can be carried out in the unit. The unified heat engine-heat pump comprises of at least one high pressure conduit 125 formed by heat conducting wall 126. Each of the high pressure conduits is separated into a first compartment 127 and a second compartment 128 by a floating divider 129. The first compartment 127 contains a first (S/L)-type working medium and is used as a heat engine operated between temperatures $T_1$ and $T_2$; the second compartment 128 contains a second (S/L)-type working medium and is used as a heat pump pumping heat from $T_4$ to $T_3$. The first medium is melted at a high pressure $(P_H)_1$ and temperature $T_1$ to absorb heat $q_1$ and is solidified at a low pressure $(P_L)_1$ and temperature $T_2$ to release heat $-q_2$. The second medium is melted at a low pressure $(P_L)_2$ and temperature $T_4$ to absorb heat $q_4$ and is solidified at a high pressure $(P_H)_2$ and temperature $T_3$ to release heat $-q_3$. Fig. 20-a shows that the high pressure melting of the first medium and the high pressure solidification of the second medium are carried out in the first and second compartments simultaneously. The first medium does work on the second medium by moving the floating dividers to the right. FIG. 20-b shows that the low pressure solidification of the first medium and the low pressure melting of the second medium are carried out in the two compartments simultaneously. During this operation the second medium pushes the floating dividers to the left. The two mediums thus perform cyclic operations. The amounts of heat that are absorbed and released $q_1$, $-q_2$, $-q_3$, and $q_4$ are transmitted through the walls by heating and cooling mediums provided in the compartments 130 and 131. The volume changes of the two mediums tend to compensate each other during the simultaneous operations described. However, the total volume of the two mediums may still vary to some extent during the cyclic operatons. Such volume changes may be compensated by supplying some fluid from or discharge some fluid to a fluid storage 132 through a high pressure pump or a turbine 133 and valves 134 and 135.

It is noted that for the operations illustrated by FIGS. 16-b and 16-c, straight chain paraffin hydrocarbons and their mixtures may be used as the working mediums. It is advantageous to use straight chain paraffin hydrocarbons, because they are stable, non-corrosive, low in cost and they have high latent heats of melting. The melting points of n-tridecane, n-tetradecane, n-pentadecane and n-hexadecane are respectively 22° F, 42° F, 50° F, and 65° F. One may use n-tridecane and n-pentadecane as the working mediums for the heat engine and the heat pump respectively for the operation illustrated by FIG. 16-b and use n-tetradecane and n-hexadecane as the working mediums for the heat engine and the heat pump respectively for the operation illustrated by FIG. 16-c.

For a given unified heat engine-heat pump unit illustrated by FIG. 20 and given conditions for the heating and cooling mediums at $T_1$ and $T_2$, the system pressure $P_H$ automatically seeks for a value such that the temperature of the first medium be lower than $T_1$ by a certain amount and the temperature of the second medium be higher than $T_2$ by a certain amount for the required rates of heat transfer. In an actual operation, one may close valves 134 and 135. Then, the mediums do seek a new pressure so that the total volume of mediums remains substantially constant throughout the high pressure and low pressure operations.

In each of the processes described so far, it has been assumed that the (S/L)-type working medium used is of the type that expands as it is melted and contracts as it is solidified. When water or an aqueous solution is used as the working medium, it contracts as it is melted and expands as it is solidified. When such a medium is used in a heat engine, it is melted under a high temperature and low pressure and it is solidified under a low temperature and a high pressure. Work is derived during the solidification step conducted under the low temperature and high pressure condition. When water or an aqueous solution is used as the working medium in a heat pump, it is melted under a low temperature and high pressure and solidified under a high temperature and low pressure condition. 6 (Reference: J. Timmerman, "Physico-Chemical Constants of Pure Compounds", Vol. 1 and II, Elsevier Publishing Company (1950).)

What we claim are:

1. A system containing a working medium undergoing a cyclic process which comprises of a first step of removing heat energy from a heat source at a first temperature and a second step of releasing heat energy to a heat sink at a second temperature, the first temperature being lower than the second temperature, wherein the system comprises of a quantity of a working medium which may be melted under a first pressure as it removes heat at the said first temperature and be solidified under a second pressure as it releases heat at the said second temperature, and be denoted as the S/L medium, a pressure container of such strength to sustain both the first pressure and the second pressure and means for supplying work to the medium.

2. A system of claim 1, wherein the working medium is of the type that expands as it is melted and contracts as it is solidified, thereby the second pressure being substantially higher than the first pressure and work being supplied to the medium during the solidification step that is conducted under the second pressure.

3. A system of claim 1, wherein the working medium is of the type that contracts as it is melted and expands as it is solidified, thereby the first pressure being substantially higher than the second pressure and work being supplied to the medium during the melting step that is conducted under the first pressure.

4. A system of claim 1, which further comprises of a first opening and a second opening, a high pressure conduit and a low pressure conduit, and a medium storage, wherein the first opening and the second opening being respectively connected to the means for supplying work and the medium storage through the high pressure conduit and the low pressure conduit respectively.

* * * * *